US012584540B2

(12) United States Patent
Linsalato et al.

(10) Patent No.: US 12,584,540 B2
(45) Date of Patent: Mar. 24, 2026

(54) GEAR REDUCTION UNIT WITH ANTI-BACKLASH MECHANISM

(71) Applicants: Randy Linsalato, Irwindale, CA (US); Hiroshi Hoya, Irwindale, CA (US)

(72) Inventors: Randy Linsalato, Irwindale, CA (US); Hiroshi Hoya, Irwindale, CA (US)

( * ) Notice: Subject to any disclaimer, the term of this patent is extended or adjusted under 35 U.S.C. 154(b) by 5 days.

(21) Appl. No.: 19/084,156

(22) Filed: Mar. 19, 2025

(65) Prior Publication Data

US 2025/0297670 A1     Sep. 25, 2025

Related U.S. Application Data

(60) Provisional application No. 63/567,341, filed on Mar. 19, 2024.

(51) Int. Cl.
| | |
|---|---|
| *F16H 1/28* | (2006.01) |
| *B25J 9/10* | (2006.01) |
| *F16H 1/34* | (2006.01) |
| *F16H 3/46* | (2006.01) |
| *F16H 57/12* | (2006.01) |

(52) U.S. Cl.
CPC ............ *F16H 1/2863* (2013.01); *B25J 9/103* (2013.01); *F16H 1/2836* (2013.01); *F16H 2001/2881* (2013.01); *F16H 1/34* (2013.01); *F16H 3/46* (2013.01); *F16H 57/12* (2013.01); *F16H 2057/126* (2013.01)

(58) Field of Classification Search
CPC ........ F16H 1/2863; F16H 1/2836; F16H 1/34; F16H 3/46; F16H 57/12; F16H 2001/2881; F16H 2057/126; B25J 9/103
See application file for complete search history.

(56) References Cited

U.S. PATENT DOCUMENTS

| | | | | |
|---|---|---|---|---|
| 2,501,034 A | * | 3/1950 | Derbyshire | ........... F16H 1/2836 |
| | | | | 475/346 |
| 4,788,891 A | * | 12/1988 | Katori | ....................... F16H 3/56 |
| | | | | 475/17 |
| 6,080,077 A | * | 6/2000 | Kamlukin | ............. F16H 57/082 |
| | | | | 180/372 |

(Continued)

FOREIGN PATENT DOCUMENTS

| | | | | |
|---|---|---|---|---|
| DE | 102017219614 A1 | * | 5/2019 | ........... F16H 1/2836 |
| JP | 2000504086 A | * | 4/2000 | |
| JP | 2017040348 A | * | 2/2017 | |

*Primary Examiner* — Justin Holmes
(74) *Attorney, Agent, or Firm* — Barry Choobin; Patent 360

(57) ABSTRACT

A gear reduction assembly for industrial robotics arms with an anti-backlash mechanism for precise positioning of the robotic arm. The gear reduction assembly includes two transfer gears and two internal gears. The two internal gears include a fixed gear that is fixedly coupled to a gear housing and an output gear that is coupled to an output shaft. The gear reduction assembly further includes a drive plate that is integral to the input shaft and is of an elongated profile. The two transfer gears are mounted to the drive plate, spaced apart from each other, and can freely rotate relative to the drive plate. The two transfer gears mesh with the fixed gear and the output gear, wherein the input shaft passes through the center of the fixed gear. The number of teeth in the fixed gear and the output gear are different which results in gear reduction.

17 Claims, 11 Drawing Sheets

100

(56)         References Cited

U.S. PATENT DOCUMENTS

2009/0221396 A1*    9/2009  Berg ......................... F16H 1/28
                                                  475/331
2022/0065328 A1*    3/2022  Luo ...................... F16H 57/023

* cited by examiner

100

200

200

240

220

270

250

270

GEAR REDUCTION UNIT WITH ANTI-BACKLASH MECHANISM

CROSS-REFERENCE TO RELATED APPLICATIONS

This application claims priority from a U.S. Provisional Patent Appl. No. 63/567,341, filed on Mar. 19, 2024, which is incorporated herein by reference in its entirety.

FIELD OF INVENTION

The present invention relates to a gear reduction unit with an anti-backlash mechanism, and more particularly, the present invention relates to a gear reduction unit with an anti-backlash mechanism for robotic arms.

BACKGROUND

Precision positioning in industrial robotic arms is critical for proper functioning. Precision typically refers to the ability of an industrial robotic arm to repeatedly and consistently reach a predefined point in three-dimensional space. In industrial robotic arms, gear reduction units are critical in precision positioning between the arm and a motor.

The concept of gear reduction is well-known and typically includes a driver gear and a driven gear, the two having different numbers of teeth. This difference in the number of teeth in the two gears is referred to as gear ratio and is used to calculate speed and torque. Space or clearance between the teeth of two meshing gears results in a backlash. The right amount of backlash is critical for proper functioning and minimizing the noise and wear & tear.

In industrial robotic arms, the backlash in gear transfer trains from the motor to the arm results in inaccuracy. Anti-backlash mechanisms are used in the gear trains to control the backlash and improve precision and accuracy. However, the present anti-backlash systems have several drawbacks that limit the amount of precision achievable in the positioning of robotic arms, and the known machinery for the backlash mechanism is bulky.

An industrial need therefore exists for a gear reduction unit with an anti-backlash mechanism that overcomes the above drawbacks.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a gear reduction unit with an anti-backlash mechanism for use in industrial robotic arms.

Another object of the present invention is that the gear reduction unit is compact.

Still, another object of the present invention is that the precision positioning of the robotic industrial arm from the motor to the arm is significantly improved.

In one aspect, disclosed is a gear reduction assembly comprising a fixed gear; an output gear coupled to an output shaft, wherein a number of teeth in the fixed gear and the output gear are different; and two transfer gears mesh with the fixed gear and the output gear, wherein the two transfer gears are coupled to an input shaft. The gear reduction assembly further comprises a drive plate of an elongated profile, the drive plate is integral with the input shaft, so that the drive plate rotates with the input shaft, and the two transfer gears are mounted spaced apart from each other to the drive plate, the two transfer gears are freely rotatable relative to the drive plate.

In one aspect, the difference in the number of teeth is two. The difference in the number of teeth between the output gear and the fixed gear results in gear reduction. Also, spring forces between the two transfer gears and the output and input gears result in the reduction of backlash. The two transfer gears exert the spring forces on the output gear. Alternatively, the fixed and output gears exert the spring forces on the two transfer gears.

In one aspect, disclosed is an industrial robotic arm comprising a gear reduction assembly. The gear reduction assembly includes a fixed gear; an output gear coupled to an output shaft, wherein a number of teeth in the fixed gear and the output gear are different; and two transfer gears mesh with the fixed gear and the output gear, wherein the two transfer gears are coupled to an input shaft. The gear reduction assembly further comprises a drive plate of an elongated profile, the drive plate is integral with the input shaft, so that the drive plate rotates with the input shaft, and the two transfer gears are mounted spaced apart from each other to the drive plate, the two transfer gears are freely rotatable relative to the drive plate.

BRIEF DESCRIPTION OF DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Figure 1:
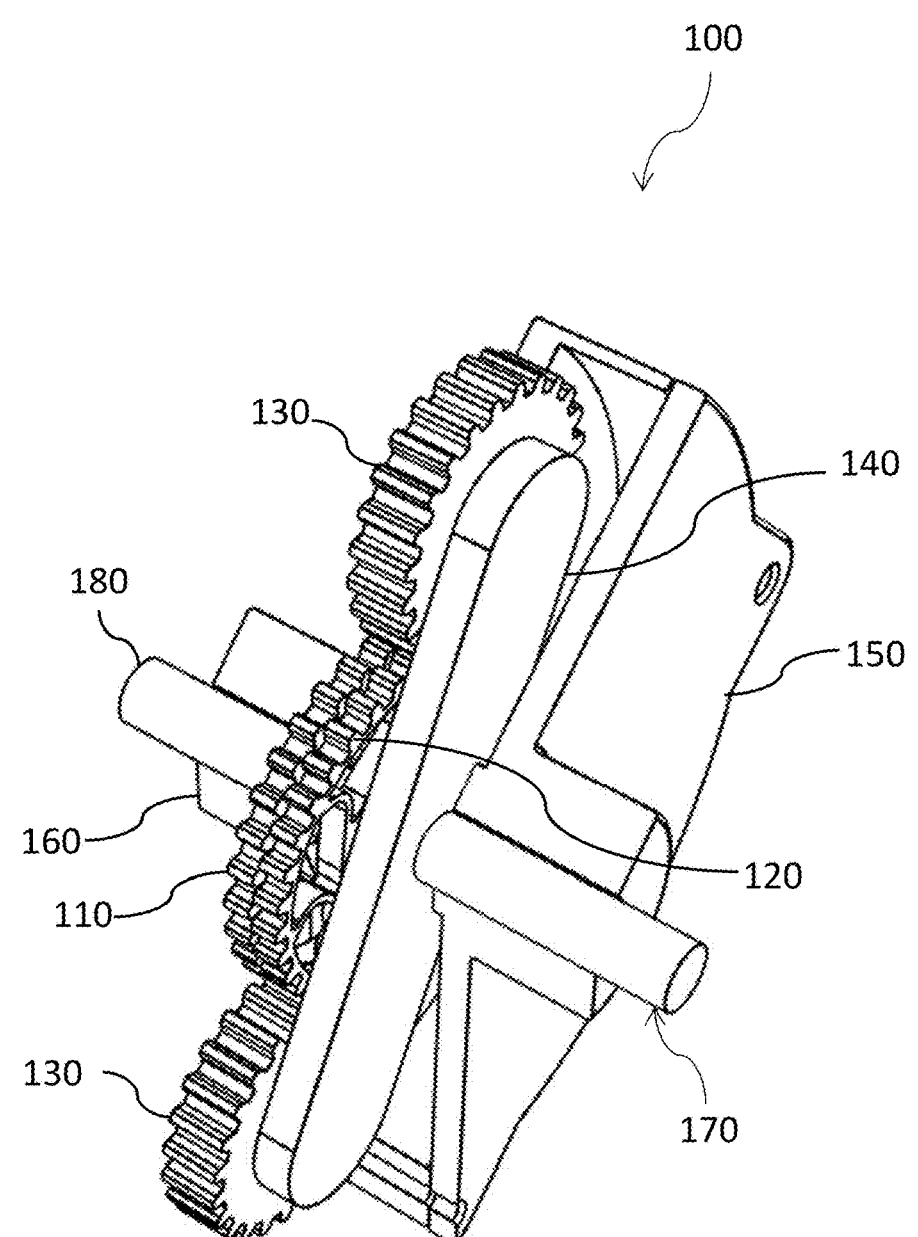
FIG. 1 is a perspective view of the gear reduction unit, according to an exemplary embodiment of the present invention.

Subject matter will now be described more fully herein-after with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is to describe particular embodiments only and is not intended to be limiting to embodiments of the invention. As used herein, the singular forms "a", "an" and "the" are intended to include the plural forms as well, unless the context clearly indicates otherwise. It will be further understood that the terms "comprises", "comprising,", "includes" and/or "including" when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

The invention described pertains to a gear reduction unit with an anti-backlash mechanism for use in industrial robotic arms. The disclosed gear reduction unit can significantly reduce the backlash resulting in precision and accuracy in positioning of the arm of the industrial robotic arm. It is to be noted that embodiments herein describe the use of the gear reduction unit with an anti-backlash mechanism for use in industrial robotic arms, however, the disclosed gear reduction unit can be used with any other suitable device or machinery and any such use is within the scope of the present invention. Thus, the disclosed gear reduction unit is not limited to robotic arms.

In certain implementations, disclosed is a gear reduction unit that includes at least two internal gears that can be used in combination side-by-side, and the teeth of the two internal gears can engage with other gears including transfer gears or external gears. The teeth of the two internal gears may be aligned to combine the two internal gears. Preferably, each internal gear may have an even number of teeth. Preferably, the number of teeth in the first internal gear may be different from the number of teeth in the second gear of the two internal gears. Preferably, the difference in the number of teeth in the two internal gears may be two. It is to be understood that it may be preferable that the internal gears have an even number of teeth, however, the number of teeth may be odd, and the odd number of teeth is within the scope of the present invention. Also, it is to be understood that it may be preferable that the difference in the number of teeth may be two, however, the difference may be one or more, and such difference in the number of teeth is within the scope of the present invention. When the difference in the number of teeth is two and the two internal gears are aligned, the teeth of the first internal gear may lie substantially between two adjacent teeth of the second internal gear. Also, the internal gears according to the present invention can be implemented in the forms of flexible rings, internal, face, and bevel gears.

One of the two internal gears may be referred to herein as a fixed gear and the other internal gear may be referred to as an output gear. For example, the fixed gear may have 52 teeth, and the output gear may have 50 teeth. The fixed gear and the output gear may mesh with transfer gears causing a gear reduction. The transfer gear may be pinion gear. When the transfer gears are rotated relative to the fixed and output gears, it may cause the output gear to move a distance of a two-tooth difference of the fixed gear for each revolution of the input shaft. It is to be noted that the number of teeth mentioned is for illustration only, and the number of teeth may vary without departing from the scope of the present invention. For example, when the number of teeth in the two internal gears is in a ratio of 50:52, the reduction may be $\frac{1}{25}$.

Figure 2:
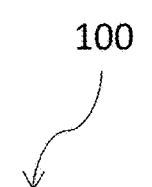
FIG. 2 is another perspective view of the gear reduction unit, according to an exemplary embodiment of the present invention.
Figure 2:
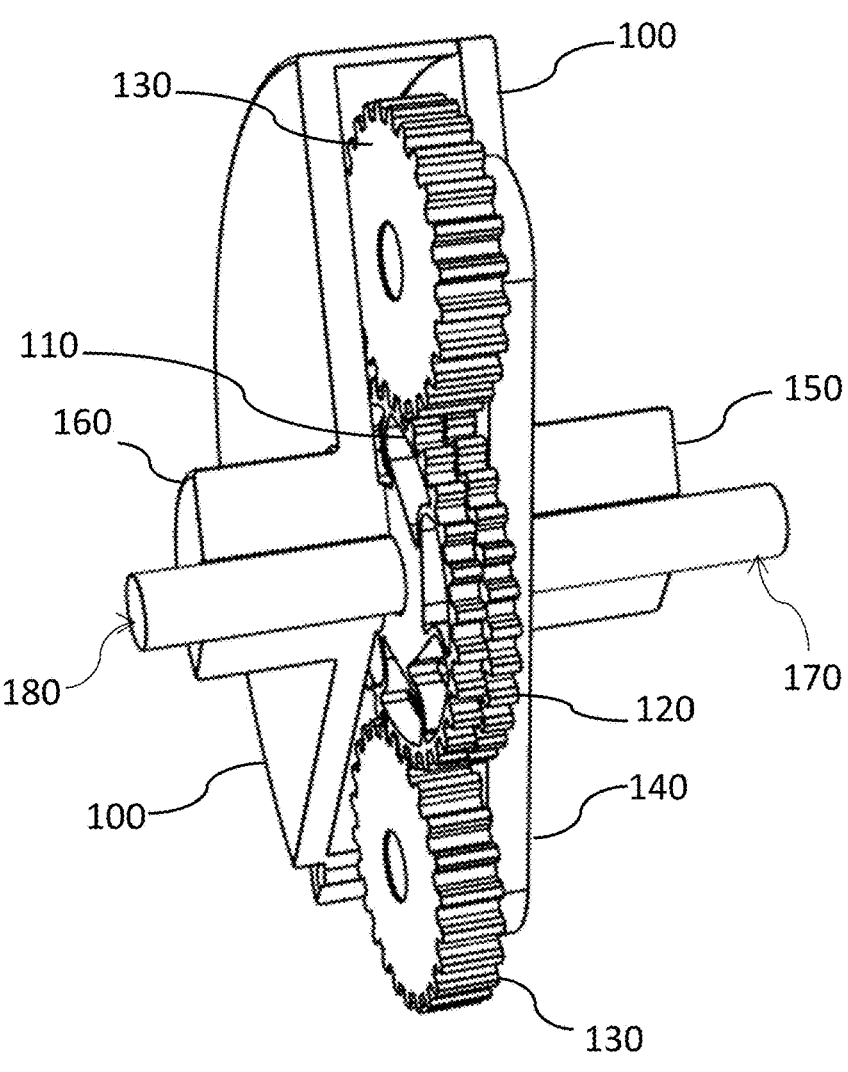
Figure 3:
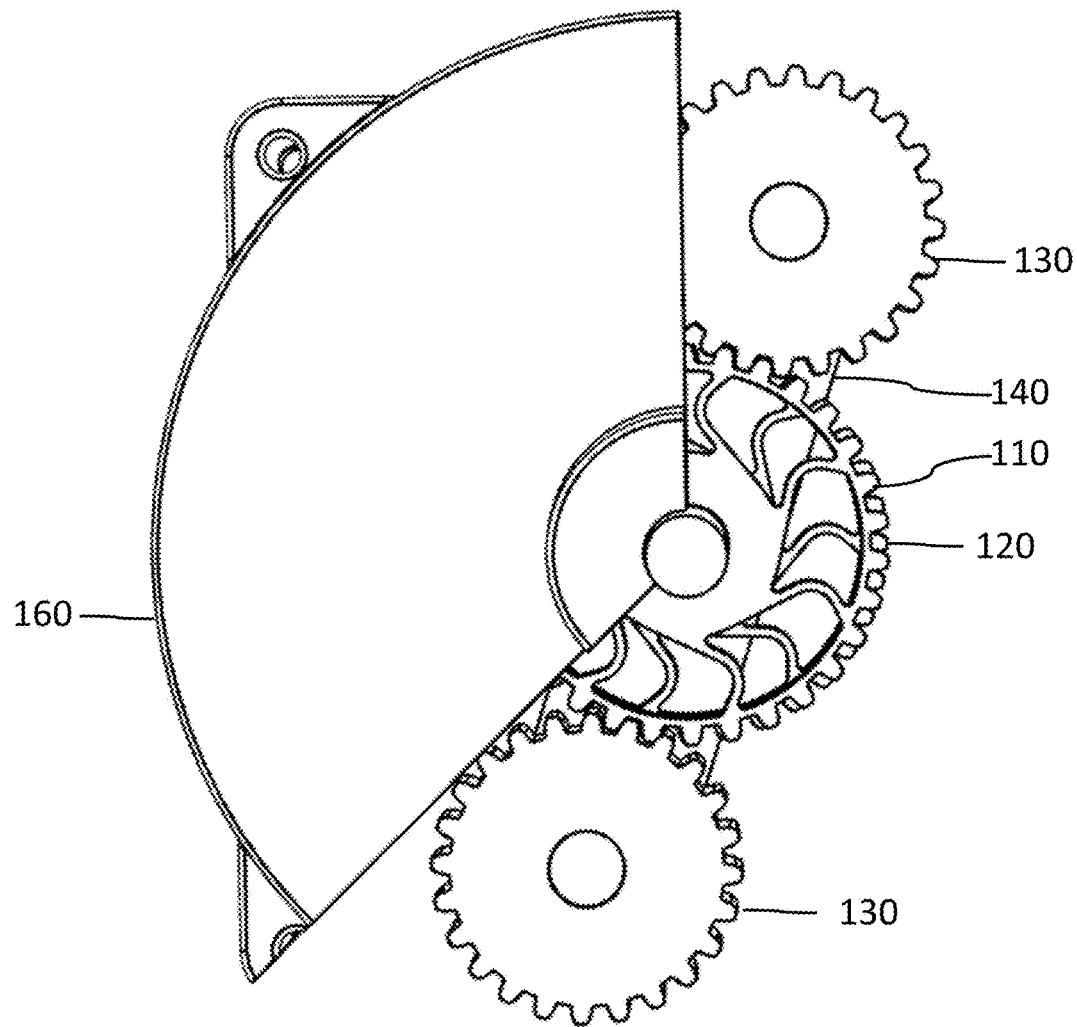
FIG. 3 is a side view of the gear reduction unit, according to an exemplary embodiment of the present invention.
Figure 4:
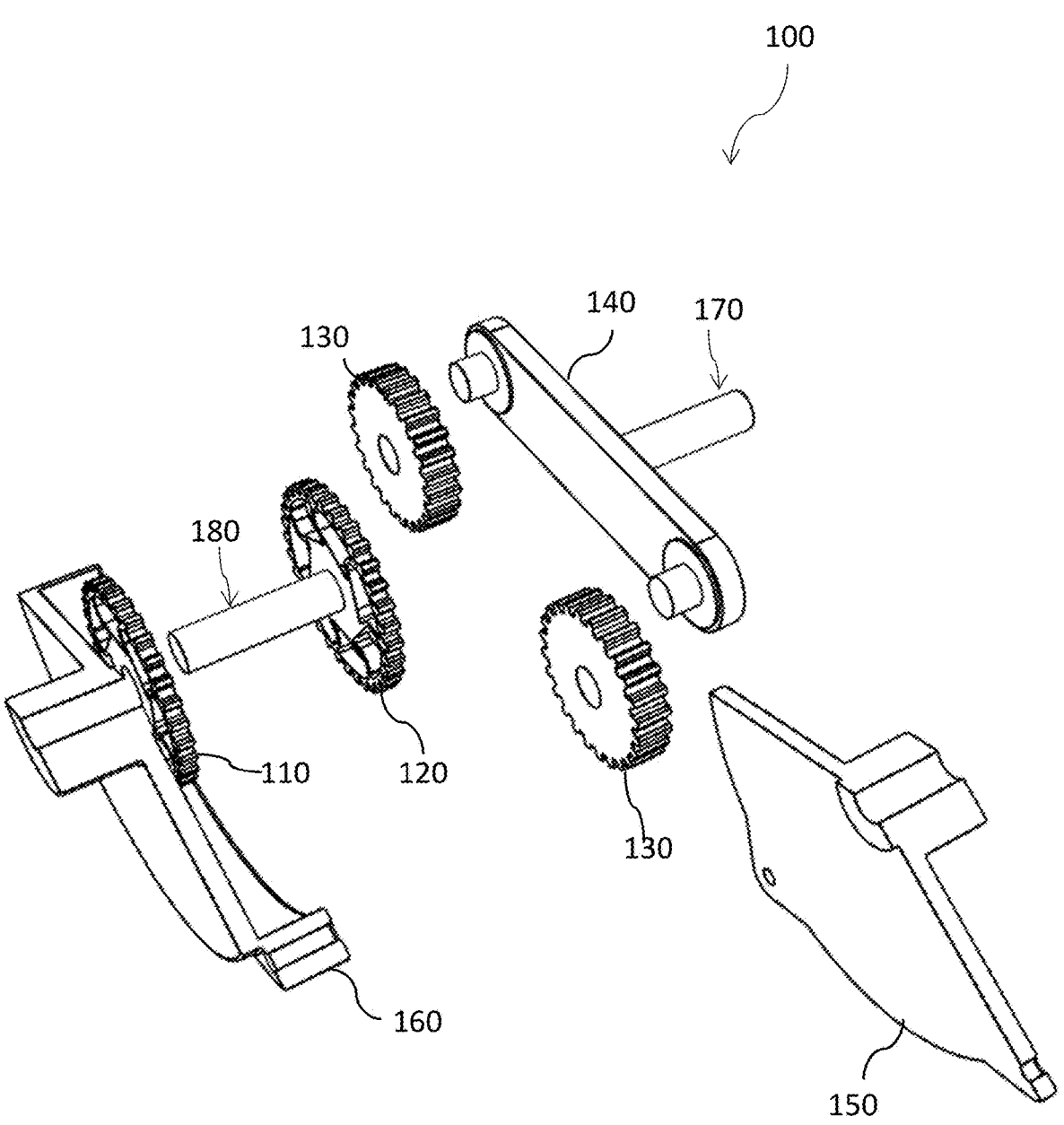
FIG. 4 shows an exploded view of the gear reduction unit, according to an exemplary embodiment of the present invention.

Referring to FIGS. 1-3 which show an embodiment of the gear reduction unit 100 and FIG. 4 which shows an exploded view of the gear reduction unit 100. The gear reduction unit 100 includes a fixed gear 110, an output gear 120, a pair of transfer gears 130, and a drive plate 140 to which the two transfer gears 130 are mounted. The drive plate has an elongated profile and may include a proximal end and a distal end. The two transfer gears are mounted spaced apart from each other near the proximal end and the distal end respectively. The transfer gears may be pinion gears and also referred to herein as the drive gears and the output gear is also referred to herein as the driven gear.

The transfer gears may have an integral input shaft 170, a first housing 150 that has a bracket for mounting the input shaft 170, and a second housing 160 to which the fixed gear 110 is coupled. The output gear 120 has an integral output shaft 180 which passes through a casing in the fixed gear 110 and the second housing 160. The fixed gear 110 may have 52 teeth while the output gear may have 50 teeth. The two transfer gears 130 may be freely and rotatably mounted to the respective shafts of the drive plate 140. The rotation of the drive plate may move the two transfer gears in a circle, while the transfer gears themselves can freely rotate on their rotational axis. The two transfer gears 130 may mesh with both the fixed gear 110 and the output gear 120.

The input shaft 170 may be rotated, which in turn may rotate the drive plate 140. The drive plate 140 may circle the two transfer gears 130. The transfer gears 130 may freely rotate over their respective shafts of the drive plate 140. The circling of the two transfer gears 130 may transfer the motion to the output gear 120 which in turn can rotate the output shaft 180. There may be no actual transfer of motion, the difference in the number of teeth between the output and the fixed gears results in the gear reduction.

Figure 5:
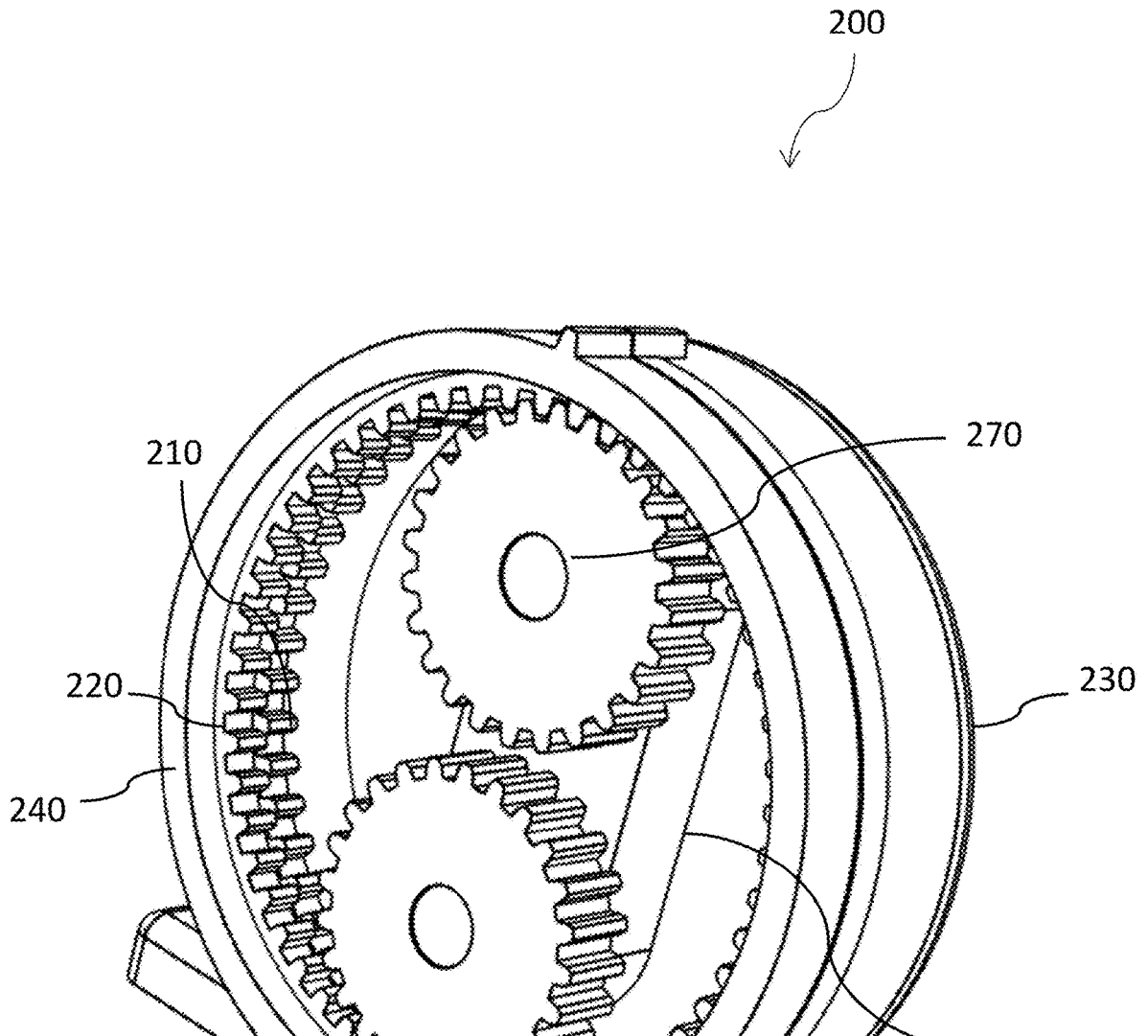
FIG. 5 is a perspective view of another embodiment of the gear reduction unit, according to the present invention.
Figure 6:
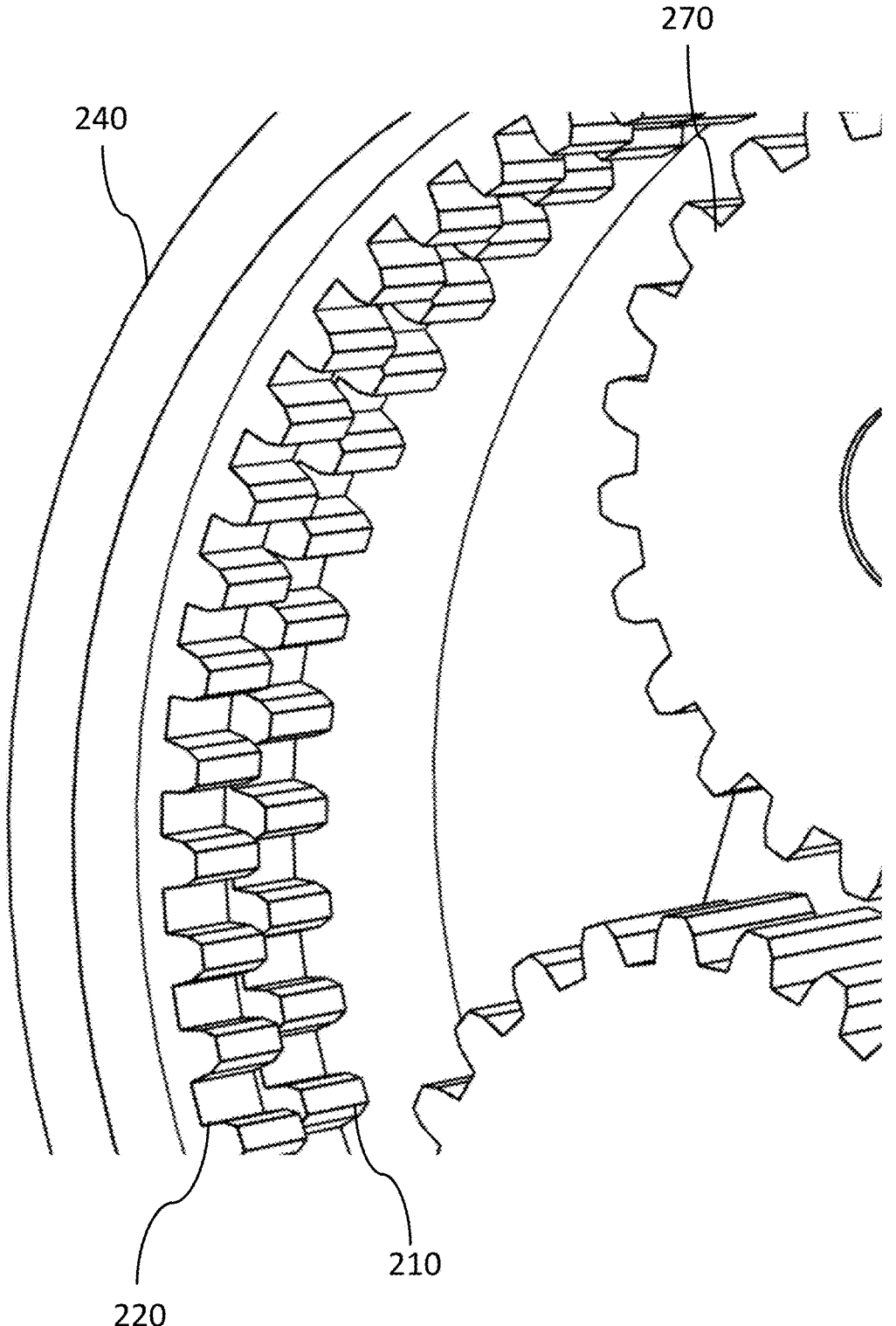
FIG. 6 is an enlarged view of the gear reduction unit shown in FIG. 5, according to an exemplary embodiment of the present invention.
Figure 7:
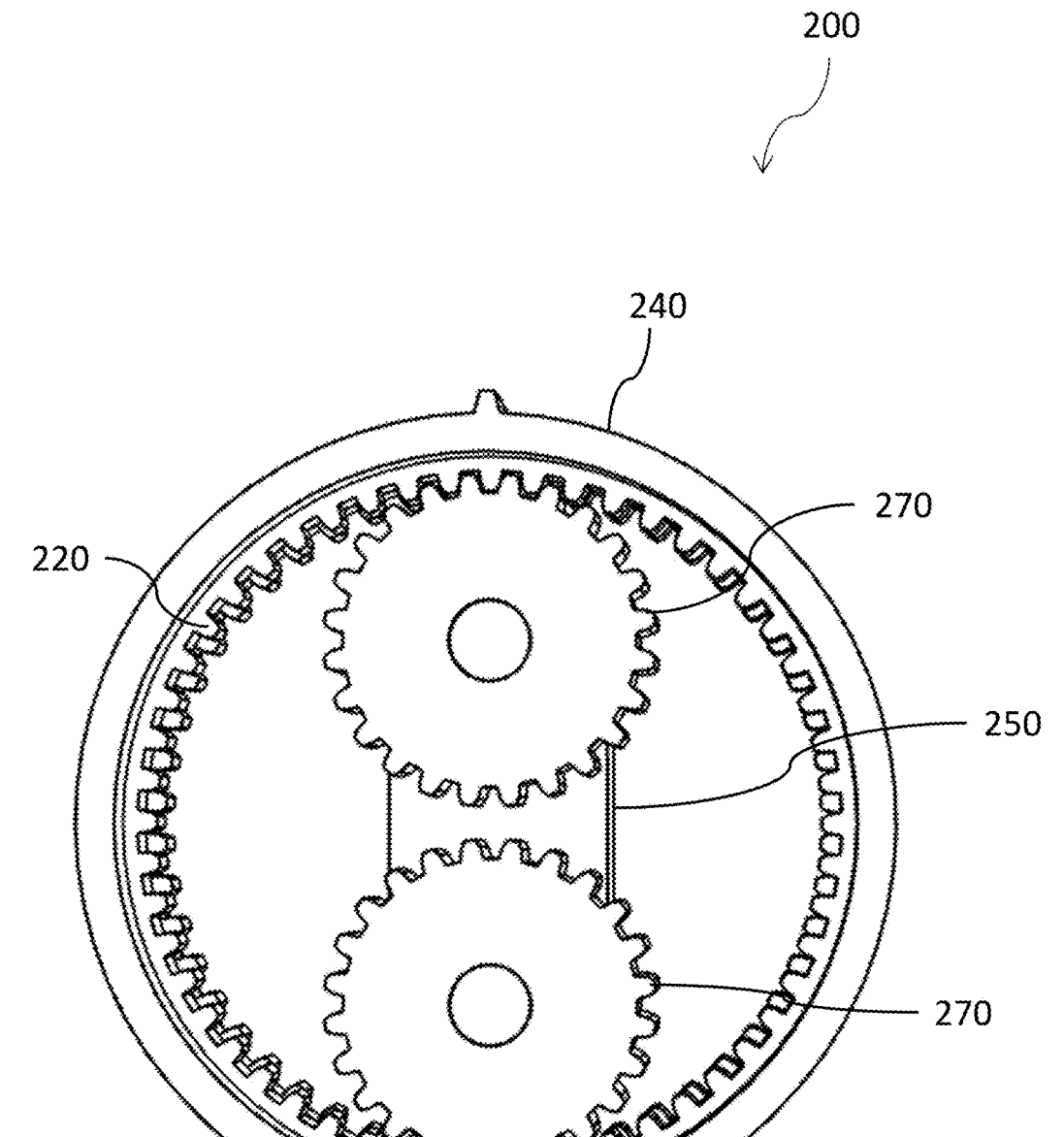
FIG. 7 is a front view of the gear reduction unit shown in FIG. 5, according to an exemplary embodiment of the present invention.
Figure 8:
FIG. 8 shows a side view of the gear reduction unit shown in FIG. 5, according to an exemplary embodiment of the present invention.
Figure 8:
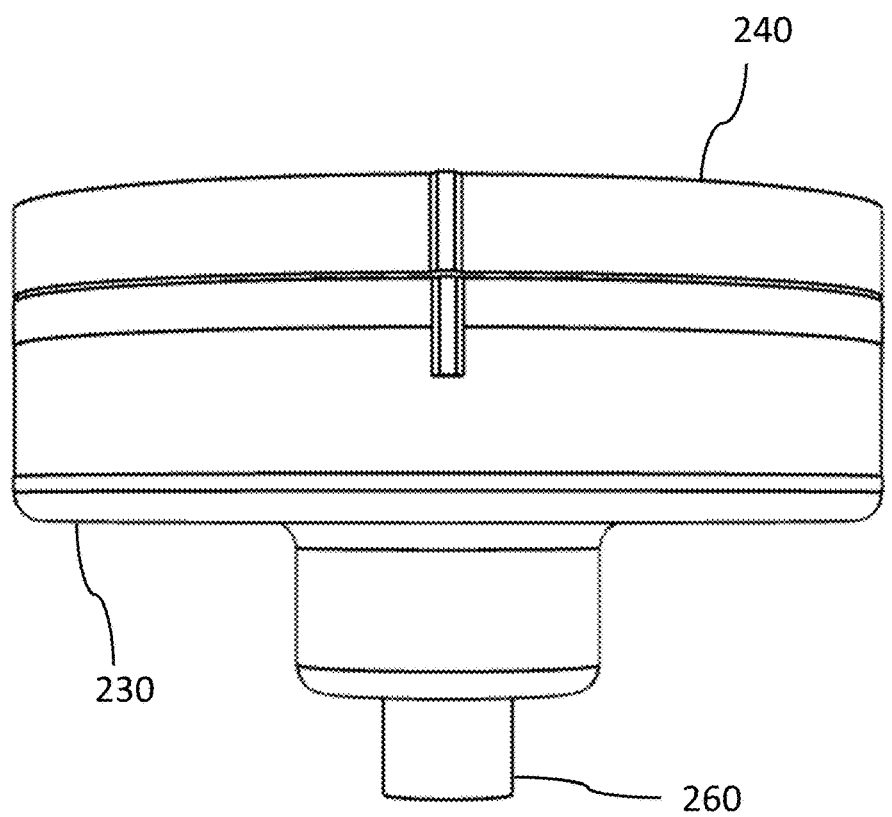
Figure 9:
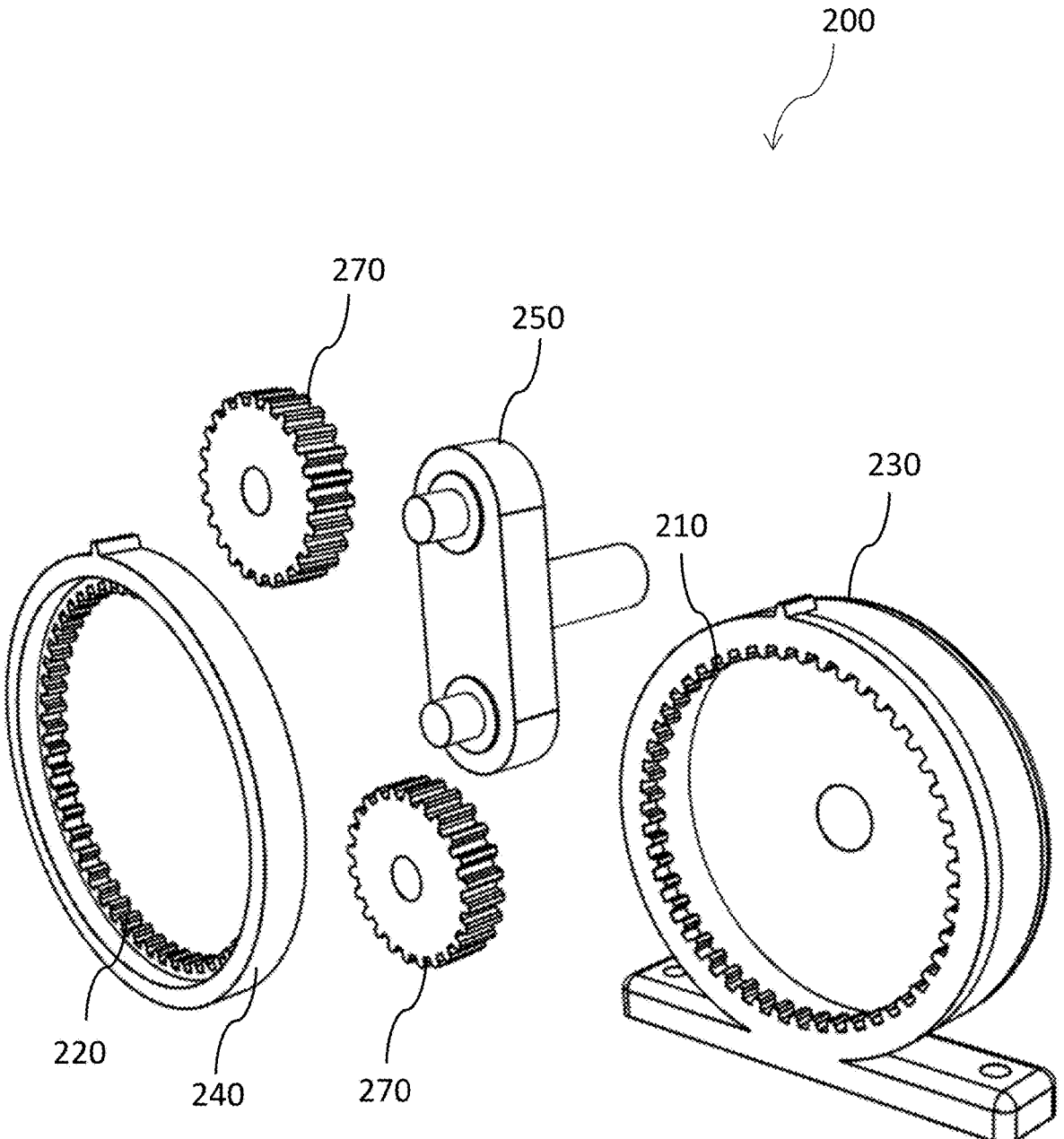
FIG. 9 shows an exploded view of the gear reduction unit shown in FIG. 5, according to an exemplary embodiment of the present invention.

Referring to FIG. 5 which shows another embodiment of the gear reduction unit 200 which has two internal gears in the form of ring gears. FIG. 6 shows an enlarged view of the two internal gears meshed with two transfer gears. FIG. 7 shows the front view of the gear reduction unit 200 and FIG. 8 shows a side view of the gear reduction unit 200. FIG. 9 shows the exploded view of the gear reduction unit 200. The gear reduction unit 200 includes a fixed ring gear 210 and an output ring gear 220. The fixed ring gear 210 and the output ring gear 220 may have different numbers of teeth. For example, the output ring gear 220 may have 52 teeth while the fixed ring gear 210 may have 50 teeth.

The fixed ring gear 210 may be attached to the first gear housing member 230. The output ring gear 220 may be integral with a housing member 240. A drive plate 250 having an integral input shaft 260 (shown in FIG. 8) may be mounted to the first gear housing member 230. The two transfer gears 270 are freely and rotatably mounted to the drive plate 250. As shown in FIG. 7, the two transfer gears may be spaced apart from each other, move in a circle with the drive plate, and can freely rotate on their rotational axis relative to the drive plate. The two transfer gears 270 may mesh with the output ring gear 220 and the fixed ring gear 210.

In order to achieve accurate pulsation-free deceleration using the two internal gears with a difference in the number of teeth and meshed with two opposing transfer gears at 180 degrees for driving them as explained above, it is preferable to set the difference in the number of teeth between the internal gears having even-numbered teeth with an involute tooth profile to be two because of the nature of the involute gear. This is due to the dislocation that makes the meshing pitch circles of the two internal gears the same. However, if some degree of inaccurate angle transmission is acceptable, it may be possible to adopt a non-involute tooth profile.

In certain implementations, additional output gears may also be stacked to facilitate different gear ratios. The flexibility of the output gears may result in gear clearance reduction and in turn, eliminates backlash by the spring force of the flexibility. The flexibility of the fixed and output gears is accomplished either via a solid or relieved portion, allowing the ring, internal, or face to apply a spring pressure to the fixed and output gears, reducing the clearance between meshing surfaces while eliminating backlash. The fixed gear creates the alignment of the transfer gears to the output gear when the rotating transfer gears mesh with the output gear. Input power goes into the drive plate and moves the transfer gears aligning the output gear teeth 180 degrees apart.

An advantage of the present invention is that the reducer can be compacted significantly. Also, it was observed that in order for two pinion gears (transfer gears) to mesh with the internal gears at a position facing each other at 180°, it is most reasonable to set the difference in the number of teeth between the two gears to two, and if the difference in the number of teeth is one, the pinion and two gears facing each other at 180° did not mesh. Also, generally, it is more desirable for the reduction ratio to be an integer, so it is better to increase the number of teeth on the fixed gear to obtain a cleaner reduction ratio. However, the number of teeth on the fixed gear relative to the output gear can be increased or decreased, and both aspects are within the scope of the present invention. Also, the design of two internal gears may be such that the mesh pitch circle diameter of the two gears that mesh with the pinion gear is the same. The material, heat treatment, hardness, surface treatment, etc. of each of the two internal gears may be the same. However, any variations in the material, heat treatment, hardness, surface treatment, etc. are within the scope of the present invention.

In certain implementations, the output gear may also minimize the backlash by applying spring forces on the transfer gears. Similarly, the transfer gears may minimize the backlash by applying spring forces on the fixed gear and output gear. Either set can apply spring force upon others, provided at least one set needs to be solid. The set being the transfer/drive gears or fixed/output gears. Also, both mating gears, between the transfer and fixed and the transfer and output, may have independent spring force to remove backlash. If one of the sets requires more spring movement, it may not be restrained by the other set. As shown in the drawings, the flexible gears are independent but connected at the base diameter to allow the spring force. In FIG. 5, the fixed and output ring gears may be flexible and apply the spring force to the transfer/drive gears. This additional feature may improve uneven wear between the sets.

In certain implementations, the difference in the teeth between the fixed and output gears provides a reduction. So, each revolution of the input shaft may cause the output gear to rotate 2 teeth less. The number of teeth on the transfer/drive gears may be such that to allow aligning the teeth on the fixed and output gears. So, if the input shaft rotates once the output shaft may only rotate the amount of one tooth advancement of the fixed gear.

Figure 10:
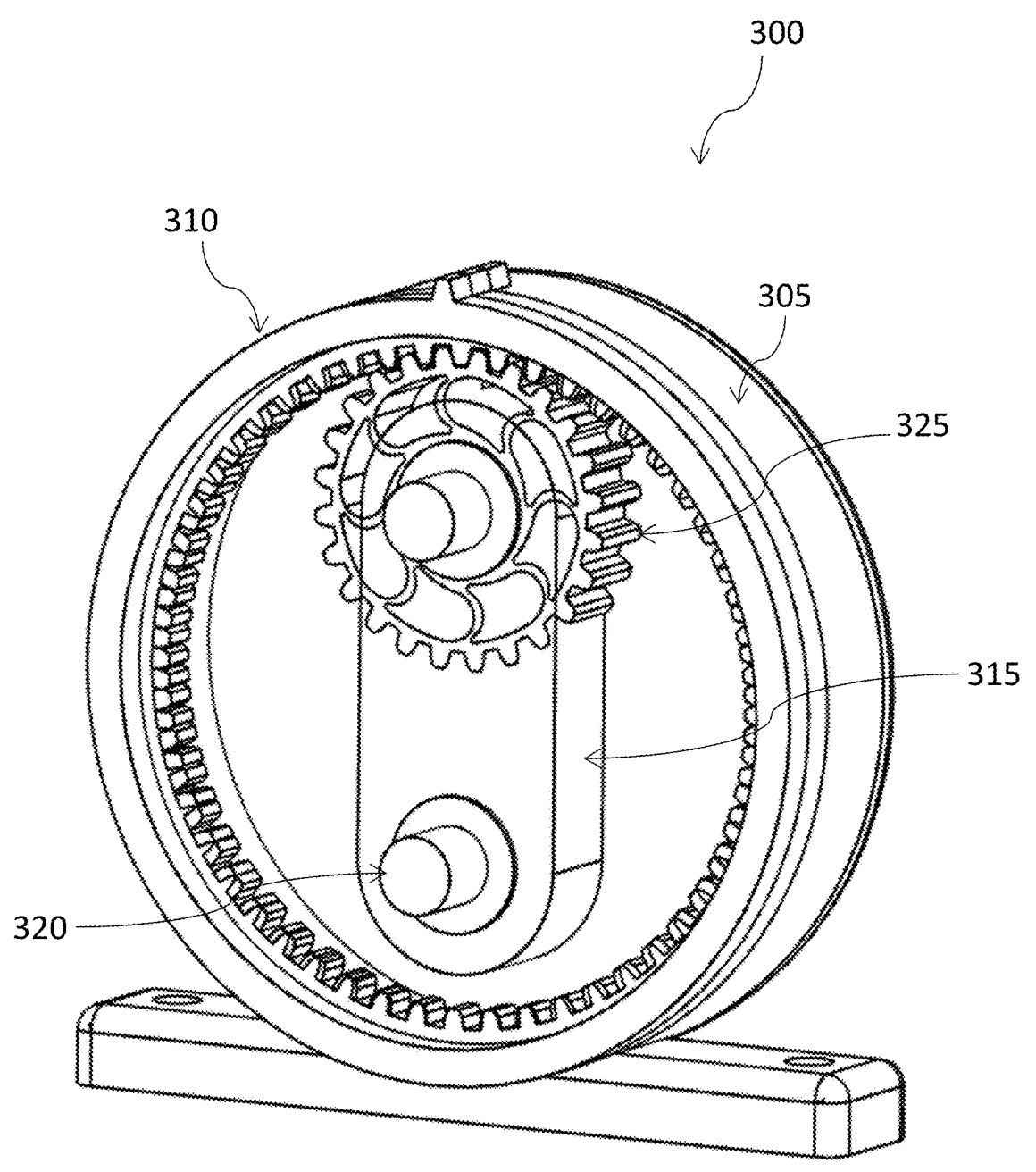
FIG. 10 illustrates the meshing of transfer gears for backlash reduction, according to an exemplary embodiment of the present invention.
Figure 11:
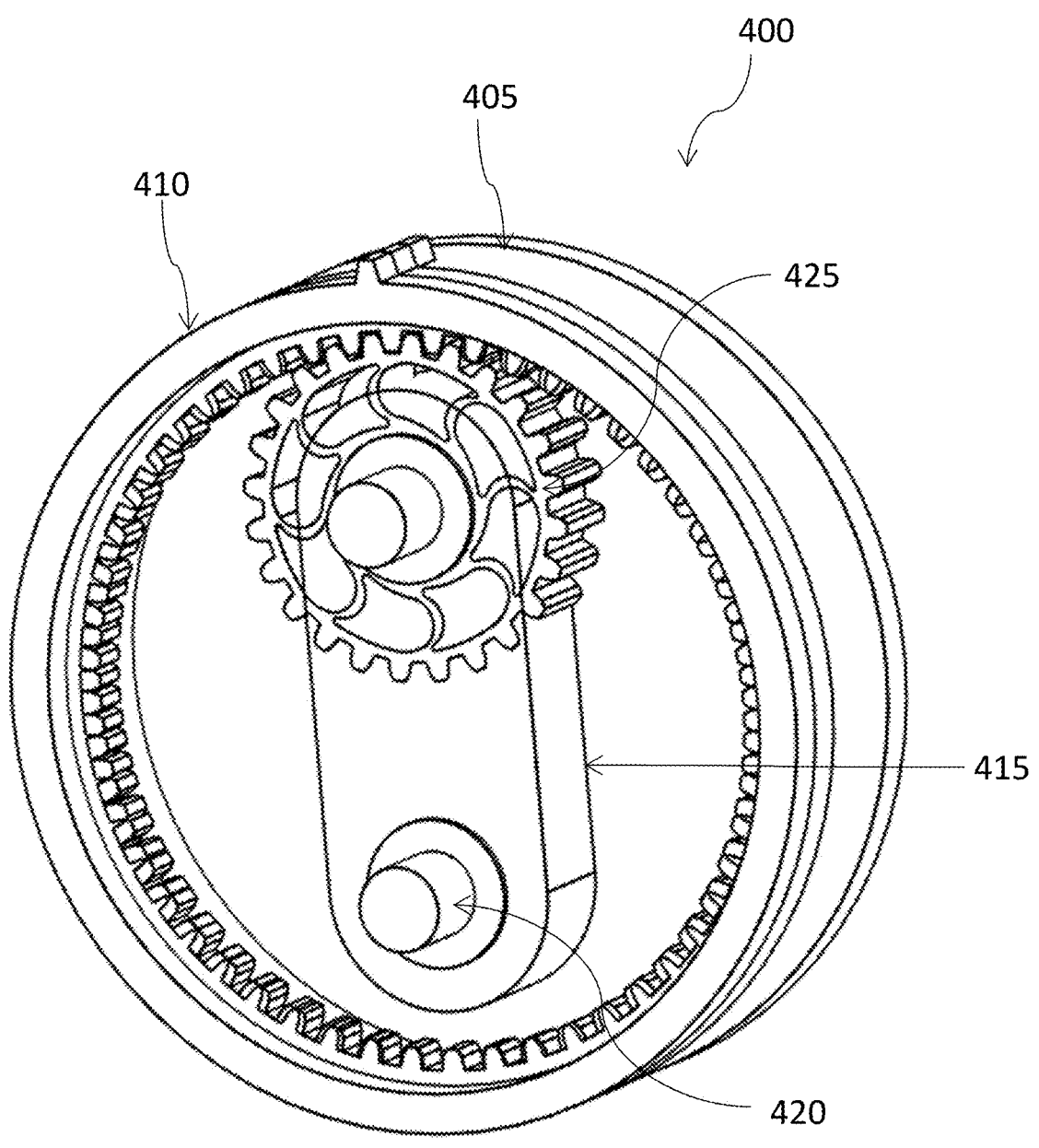
FIG. 11 illustrates the meshing of transfer gears for backlash reduction, according to an exemplary embodiment of the present invention.

Referring to FIGS. 10 and 11, which illustrate the spring forces between the transfer gear and the output gear. FIG. 10 shows the assembly 300 having a gear housing 305, an output ring gear 310, a drive plate 315, a shaft 320 for mounting the transfer gear in a freely rotatable manner, and a transfer gear 325. FIG. 11 shows the assembly 400 having a gear housing 405, an output ring gear 410, a drive plate 415, a shaft 420 for mounting the transfer gear in a freely rotatable manner, and a transfer gear 425.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A gear reduction assembly comprising:
a fixed gear;
an output gear coupled to an output shaft, wherein a number of teeth in the fixed gear and the output gear are different, wherein the fixed gear and the output gear are flexible and disposed in combination side-by-side;
two transfer gears mesh with the fixed gear and the output gear, wherein the two transfer gears are coupled to an input shaft,
a drive plate of an elongated profile, the drive plate is integral with the input shaft, so that the drive plate rotates with the input shaft, and the two transfer gears are mounted to two shafts of the drive plate, the two shafts of the drive plate are spaced apart from each other, extends parallel to each other and perpendicular to the drive plate, the two transfer gears are freely rotatable relative to the drive plate and wherein transfer gears or the output/fixed gears are flexible, and that the output/fixed gears exert a spring force on the transfer gears or the transfer gears exert a spring force on the output/fixed gears.

2. The gear reduction assembly of claim 1, wherein the difference in the number of teeth is two.

3. The gear reduction assembly of claim 2, wherein the difference in the number of teeth between the output gear and the fixed gear results in gear reduction.

4. The gear reduction assembly of claim 3, wherein spring forces acting only between the two transfer gears and the output and input gears, results in a reduction of backlash.

5. The gear reduction assembly of claim 4, wherein the two transfer gears exert the spring forces on the output gear.

6. The gear reduction assembly of claim 4, wherein the fixed and output gears exert the spring forces on the two transfer gears.

7. A method for gear reduction, the method comprising:
providing a gear reduction assembly comprising:
a fixed gear;
an output gear coupled to an output shaft, wherein a number of teeth in the fixed gear and the output gear are different, wherein the fixed gear and the output gear are disposed in combination side-by-side;
two transfer gears mesh with the fixed gear and the output gear, wherein the two transfer gears are coupled to an input shaft; and
a drive plate of an elongated profile, the drive plate is integral with the input shaft, so that the drive plate rotates with the input shaft, and the two transfer gears are mounted to two shafts of the drive plate, the two shafts of the drive plate are spaced apart from each other, extends parallel to each other and perpendicular to the drive plate, the two transfer gears are freely rotatable relative to the drive plate; and
rotating the input shaft.

8. The method of claim 7, wherein the difference in the number of teeth is two.

9. The method of claim 8, wherein the difference in the number of teeth between the output gear and the fixed gear results in gear reduction.

10. The method of claim 9, wherein spring forces acting only between the two transfer gears and the output and input gears, results in a reduction of-backlash.

11. The method of claim 10, wherein the two transfer gears exert the spring forces on the output gear.

12. The method of claim 10, wherein the fixed and output gears exert the spring forces on the two transfer gears.

13. An industrial robotic arm comprising:
a gear reduction assembly comprising:
a fixed gear;
an output gear coupled to an output shaft, wherein a number of teeth in the fixed gear and the output gear are different, wherein the fixed gear and the output gear are disposed in combination side-by-side;
two transfer gears mesh with the fixed gear and the output gear, wherein the two transfer gears are coupled to an input shaft,
a drive plate of an elongated profile, the drive plate is integral with the input shaft, so that the drive plate rotates with the input shaft, and the two transfer gears are mounted to two shafts of the drive plate, the two shafts of the drive plate are spaced apart from each other, extends parallel to each other and perpendicular to the drive plate, the two transfer gears are freely rotatable relative to the drive plate.

14. The industrial robotic arm of claim 13, wherein the difference in the number of teeth is two.

15. The industrial robotic arm of claim 14, wherein the difference in the number of teeth between the output gear and the fixed gear results in gear reduction.

16. The industrial robotic arm of claim 15, wherein spring forces acting only between the two transfer gears and the output and input gears, results in a reduction of backlash.

17. The industrial robotic arm of claim 16, wherein the two transfer gears exert the spring forces on the fixed and output gears, or the fixed and output gears exert the spring forces on the two transfer gears.

* * * * *